(12) United States Patent
Kinoshita

(10) Patent No.: US 7,710,591 B2
(45) Date of Patent: May 4, 2010

(54) IMAGE FORMING APPARATUS AND METHOD FOR ERASING IMAGE DATA

(75) Inventor: Mitsuhiro Kinoshita, Shizuoka-ken (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/421,747

(22) Filed: Jun. 1, 2006

(65) Prior Publication Data

US 2008/0002231 A1    Jan. 3, 2008

(51) Int. Cl.
G06K 15/00    (2006.01)
(52) U.S. Cl. .............. 358/1.16; 358/1.13; 358/1.14; 358/1.15; 707/5; 707/10; 715/234; 715/863; 715/764
(58) Field of Classification Search ....... 358/1.13–1.16; 707/5, 10; 715/234, 863, 764
See application file for complete search history.

(56) References Cited

U.S. PATENT DOCUMENTS

| | | | |
|---|---|---|---|
| 2002/0089543 A1* | 7/2002 | Ostergaard et al. | 345/764 |
| 2002/0126161 A1* | 9/2002 | Kuzunuki et al. | 345/863 |
| 2002/0171867 A1* | 11/2002 | Nobuhara et al. | 358/1.15 |
| 2003/0191938 A1* | 10/2003 | Woods et al. | 713/165 |
| 2004/0012812 A1* | 1/2004 | Shimizu | 358/1.15 |
| 2006/0139680 A1* | 6/2006 | Okamoto et al. | 358/1.14 |
| 2006/0248560 A1* | 11/2006 | Wada et al. | 725/89 |
| 2007/0143190 A1* | 6/2007 | Banerjee et al. | 705/26 |
| 2007/0162454 A1* | 7/2007 | D'Albora et al. | 707/10 |
| 2007/0174766 A1* | 7/2007 | Rubin et al. | 715/530 |
| 2008/0189259 A1* | 8/2008 | Kapur | 707/5 |

FOREIGN PATENT DOCUMENTS

| | | |
|---|---|---|
| JP | 2004-7059 | 1/2004 |
| JP | 2004-153516 | 5/2004 |
| JP | 2004-153517 | 5/2004 |

* cited by examiner

Primary Examiner—Benny Q Tieu
Assistant Examiner—Quyen Ngo
(74) Attorney, Agent, or Firm—Patterson & Sheridan, LLP

(57) ABSTRACT

An image forming apparatus includes an image data input unit configured to take in image data, an image data memory unit configured to save image data, a data output unit configured to output the image data in a specific format, and an image data erasing unit configured to erase the image data saved in the image memory unit after output processing by the data output unit is completed. The image data erasing unit requests the user to make a selection as to whether or not an erasing manipulation for image data as an erasure object is executed, and erases the image data by an erasing method at a different security level according to the selection in response to a selection request.

19 Claims, 3 Drawing Sheets

| JOB | Grace Time |
|---|---|
| Copy | 30 Sec |
| PC Print | 5 Min |
| Scanner | 2 Min |
| Facsimile Transmission | 2 Min |
| Facsimile Reception | 10 Min |

IMAGE FORMING APPARATUS AND METHOD FOR ERASING IMAGE DATA

BACKGROUND OF THE INVENTION

1. Field of the Invention

The present invention relates to an image forming apparatus, such as a coping machine, a printer, a scanner, a facsimile machine, and a multifunction peripheral furnished with some of the capabilities of these machines, and to a method for erasing image data to erase image data related to a specific job, such as a print job, from a memory device provided to the image forming apparatus to save the image data after the job is completed.

2. Description of the Related Art

In a case where a copy of a certain document is made using a multifunction peripheral (MFP) as a copying machine, the document is first read by the scanner. Image data of the document is thus obtained. The image data is saved in the hard disc drive (HDD) provided as a memory device. The image data is then read out from the HDD and restored to an image again, and this image is printed on a sheet of paper. Even when a print job is suspended by a trouble, such as paper jamming, the configuration as above enables printing to be resumed using the image data saved in the HDD and thereby eliminates the need to scan the document again after the trouble is removed. In addition, a print job, such as sorting, multiple printing, and double face printing, can be executed smoothly. When the print job ends, the image data saved in the HDD is erased so that the document will no longer be reproduced.

A print job by the printer, a print job of reception data by a facsimile machine, and a data transmission job by a facsimile machine can be executed in the same manner. For example, for a print job that uses the MFP as a printer, print data written in a page description language is first transmitted to the MFP from a personal computer or the like. The print data is then subjected to bit map conversion page by page by a raster image processor (RIP) provided to the MFP. Page data is thus generated. The page data is temporarily saved in the HDD. The page data is then read out from the HDD and restored to an image, and this image is printed on a sheet of paper. After the print job ends, the page data saved in the HDD is erased so that the page data will no longer be reproduced.

Generally, the HDD includes a data save region and a file management region. In an HDD provided to the image forming apparatus, image data (or page data) is saved in the data save region. Also, information (so-called FAT (File Allocation Table) information) to know at which address in the data save region the image data is saved is stored in the file management region.

One method for erasing image data saved in the HDD is a method for erasing the FAT information related to the image data from the file management region. According to this data erasing method, the image data itself is not erased from the data save region. However, once the FAT information is erased, the location at which the corresponding image data is present becomes unknown, which inhibits an access to the image data. Accordingly, the image data is assumed to have been erased.

This data erasing method has an advantage that loads on the processor that performs operation control of the image forming apparatus and data processing can be reduced. According to this data erasing method, however, it is not impossible to reproduce image data because the image data itself is not erased. Should an evil-minded third party obtain an HDD in which highly confidential documents or the like are saved in the form of image data, there is a risk that the documents are restored.

Given these circumstances, as another data erasing method, there is a method for erasing image data by writing random data over the image data saved in the HDD several times. According to this method, however, it takes a long time to erase data. Also, the performance is deteriorated because, for example, a new job is limited while the data is being erased. Further, there is a problem that the life of the HDD is shortened as the number of accesses to the HDD increases.

SUMMARY OF THE INVENTION

An object of the present invention is to provide an easy-to-manipulate image forming apparatus furnished with a high security function against leakage of image data and yet achieving an excellent performance and a method for erasing image data from a memory device provided to this image forming apparatus.

An image forming apparatus of the present invention includes: an image data input unit configured to take in image data; an image data memory unit configured to save image data inputted from the image data input unit; a data output unit configured to output the image data saved in the image data memory unit in a specific format; and an image data erasing unit configured to erase the image data saved in the image data memory unit after output processing by the data output unit is completed, wherein the image data erasing unit includes: an erasing selection unit configured to request a user to make a selection as to whether or not an erasing manipulation for image data as an erasure object is executed; and a data erasing unit configured to erase the image data by an erasing method at a different security level according to the selection of the user in response to a selection request from the erasing selection unit.

Also, an image forming apparatus of the invention includes: image data input means for taking in image data according to a specific job specified by a user; memory means for saving taken-in image data; data output means for outputting the image data in a specific format according to the job; erasing selection means for requesting the user to make a selection as to whether or not the image data is erased from the memory means after an output of the image data is completed; and data erasing means for erasing the image data by an erasing method at a different security level according to the selection of the user.

A method for erasing image data of the present invention is a method for erasing image data related to a specific job from a memory device which is provided to an image forming apparatus to save image data after the job is completed, including the steps of: taking in image data; saving the image data in the memory device; outputting the image data in a specific format; requesting a user to make a selection as to whether or not the image data is erased from the memory device after an output of the image data is completed; and erasing the image data by an erasing method at a different security level according to the selection of the user.

According to the image forming apparatus and the method for erasing image data of the present invention, it is possible to make it extremely difficult to reproduce image data corresponding to a document or the like that the user judges as being highly confidential; moreover, it is possible to maintain performance and the ease of manipulation in a satisfactory manner.

DETAILED DESCRIPTION OF PREFERRED EMBODIMENTS

Hereinafter, embodiments of the present invention will be described in detail with reference to the drawings.

Figure 1:
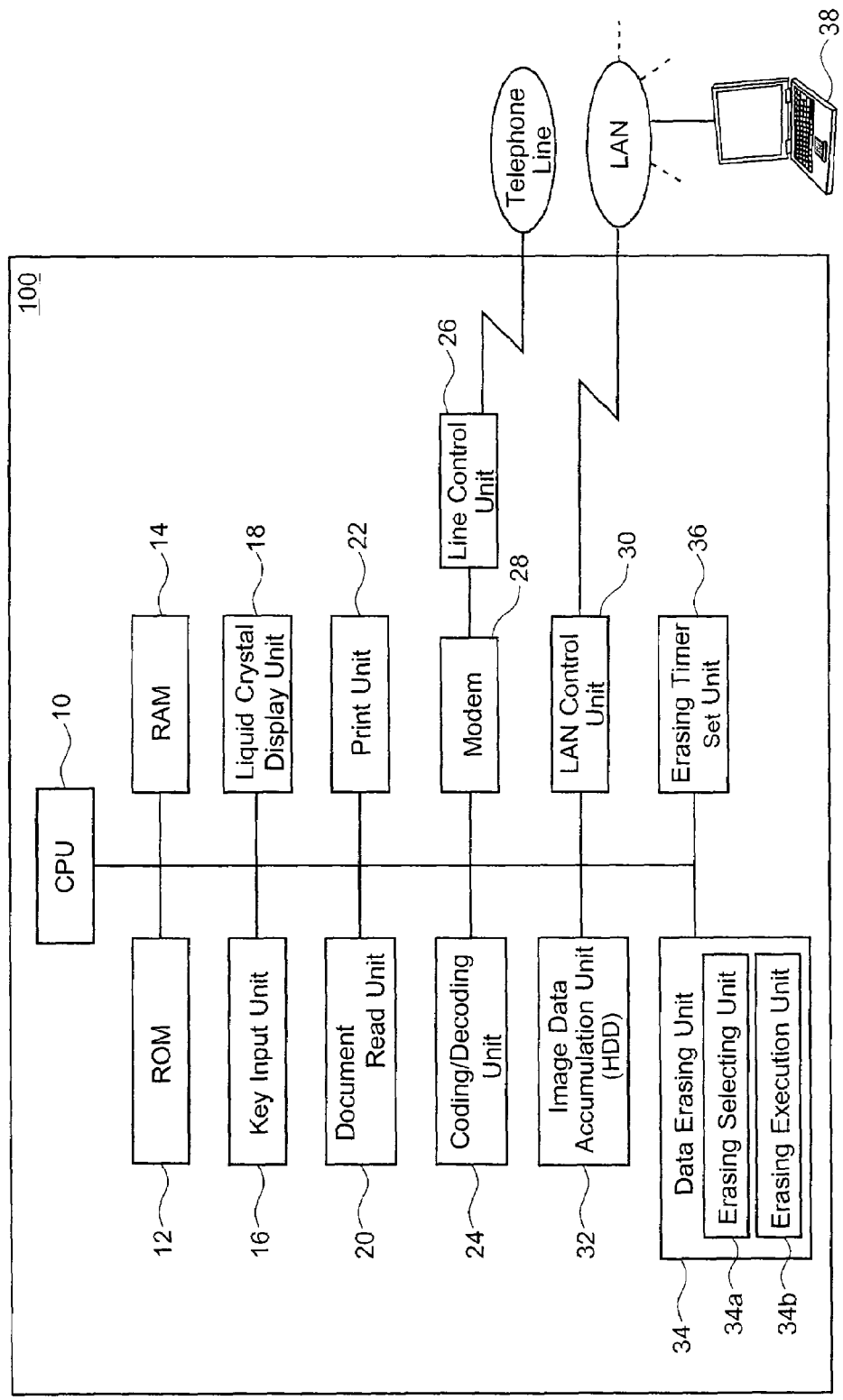
FIG. 1 is a view showing the system configuration of an image forming apparatus according to one embodiment of the present invention.

FIG. 1 is a view showing the system configuration of an image forming apparatus according to one embodiment of the present invention. An image forming apparatus 100 is a multifunction peripheral (NFP) and is furnished with capabilities of a copying machine, a printer, a scanner, and a facsimile machine.

The image forming apparatus 100 includes a central processing unit (CPU) 10 that governs operation control of the image forming apparatus 100 and data processing, a ROM 12 in which program data needed for the operation control of the image forming apparatus 100 and data processing is stored, a RAM 14 that temporarily stores control information or the like while the image forming apparatus 100 is operating, a key input unit 16 having various buttons used to manipulate the image forming apparatus 100, and a liquid crystal display unit 18 that displays manipulation information responding to manipulations on the key input unit 16 and ongoing job information. The liquid crystal display unit 18 is furnished with a touch panel capability.

The image forming apparatus 100 also includes a scanner unit 20 provided as a document read unit that reads a copy document or a facsimile transmission document, a print unit 22 that prints the copy document or reception data on a sheet of paper, a coding/decoding unit 24 that converts image data into encoded data at the time of facsimile transmission and decodes received encoded data into image data, a line control unit 26 that controls a telephone line for a facsimile communication, a modem 28 that modulates encoded data from the coding/decoding unit 24 to output the resulting signal to the line control unit 26 and demodulates a modulated signal received at the line control unit 26, a LAN control unit 30 that receives print data transmitted from a personal computer (PC) 38 linked to the image forming apparatus 100 via a LAN, and an image data memory unit 32 that saves image data or the like handled in the image forming apparatus 100.

A hard disc drive (HDD) is suitable for the image data memory unit 32. Hereinafter, assume that the image data memory unit 32 comprises an HDD, and is therefore denoted as "HDD 32".

The image forming apparatus 100 further includes an image data erasing unit 34 that erases image data saved in the HDD 32, and an erasing timer set unit 36 that sets timing to erase data in the HDD 32 by the image data erasing unit 34.

The image data erasing unit 34 includes an erasing selection unit 34a that requests the user to select a single method among plural methods for erasing image data related to a specific job, such as a copy job, from the HDD 32 when this job ends. The image data erasing unit 34 also includes a data erasing unit 34b that erases image data from the HDD 32 according to the single erasing method selected by the user. To be more concrete, the erasing selection unit 34a includes a memory device, such as a ROM, having stored a program to exert capabilities specified below, and a CPU that executes such a program.

Figures 2, 3:
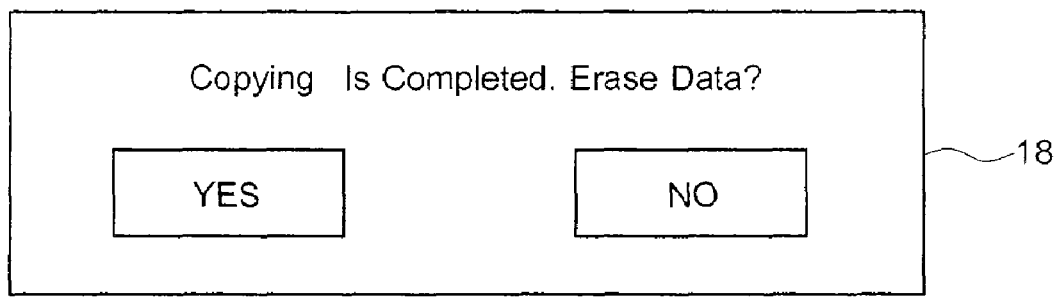
FIG. 2 is a view showing an example of a screen display on a liquid crystal display unit when a copy job is completed.
FIG. 3 is a view showing an example of a relation between a grace time and a job set in an erasing timer set unit.

The erasing selection unit 34a causes the liquid crystal display unit 18 to display erasing methods of image data. One example is shown in FIG. 2. A signal informing that the copy job is completed is sent from the CPU 10 to the erasing selection unit 34a. The erasing selection unit 34a then causes the liquid crystal display unit 18 to display a message shown in FIG. 2. When the user touches the icon of "YES" for an inquiry, "Erase data?", shown in FIG. 2, "YES" is selected, and when the user touches the icon of "NO", "NO" is selected. As will be described below, in a case where the icon of "NO" is selected, the image data is erased anyway. FIG. 2 therefore shows two erasing methods.

For example, in a case where a copy job for highly confidential documents is executed, the user selects the icon of "YES". In this case, meaningless random data, such as "00" and "FF", is written over the image data related to this copy job by the data erasing unit 34b, and further, the FAT information of the image data is erased from the HDD 32. This makes it extremely difficult to restore the image data.

In a case where a copy job for less confidential documents or non-confidential documents is executed, the user selects the icon of "NO". In this case, the FAT information of the image data related to this copy job is erased from the HDD 32 by the data erasing unit 34b. This can shorten an operation time of the HDD 32, which can in turn suppress deterioration in performance. Also, the life of the HDD 32 can be extended by reducing the number of accesses to the HDD 32.

In this manner, the image forming apparatus 100 erases image data saved in the HDD 32 by a single method selected by the user from two methods at different security levels.

It may be configured in such a manner that the image data erasing unit 34 causes the liquid crystal display unit 18 to display a message, "Erasing image data" or "Image data is erased" at once for a certain time when either the icon of "YES" or "NO" shown in FIG. 2 is selected.

There is a case that the user selects neither the icon of "YES" nor the icon of "NO". This is a case where either the user ignores the display on the liquid crystal display unit 18, or he skips a manipulation. When this case is left unresolved, there is a risk that a trouble occurs in a job execution by the image forming apparatus 100 thereafter.

This being the case, a grace time to enable the user to select the icon of either "YES" or "NO" has been previously set in the erasing timer set unit 36. In a case where the user selects neither the icon of "YES" nor the icon of "NO" by the time the grace time pre-set in the erasing timer set unit 36 has passed, the image data erasing unit 34 erases the FAT information of the image data related to this copy job from the HDD 32 after the grace time has passed. In other words, the data erasing same as that performed when a copy job for less confidential documents and non-confidential documents is executed is performed.

One example of the relation between the grace time and a job set in the erasing timer set unit 36 is set forth in FIG. 3. The grace time that can be set in the erasing timer set unit 36 includes, for example, eight kinds: 0 second, 30 seconds, one minute, two minutes, three minutes, five minutes, 10 minutes, and 30 minutes. One grace time selected from these eight kinds is set separately for each of a copy job, a PC print job, a scanner job, a facsimile transmission job, and a facsimile reception job that can be executed by the image forming apparatus 100. The manager of the image forming apparatus 100 is able to perform this setting using the key input unit 16 and the liquid crystal display unit 18.

It should be noted that the grace time is not limited to the times specified above. The grace time that can be set is not limited to eight kinds, either. In a case where the grace time is 0 second, data in the HDD 32 is erased as soon as the job is completed. In this case, the image data erasing unit 34 does not cause the liquid crystal display unit 18 to show the display of FIG. 2. The display of FIG. 2 goes off when the pre-set grace time has passed.

For a copy job with which the user often awaits near the image forming apparatus 100, it is preferable to set the grace time shorter. On the contrary, for a job when to receive is uncertain, such as a facsimile reception, it is preferable to set the grace time longer.

Figure 4:
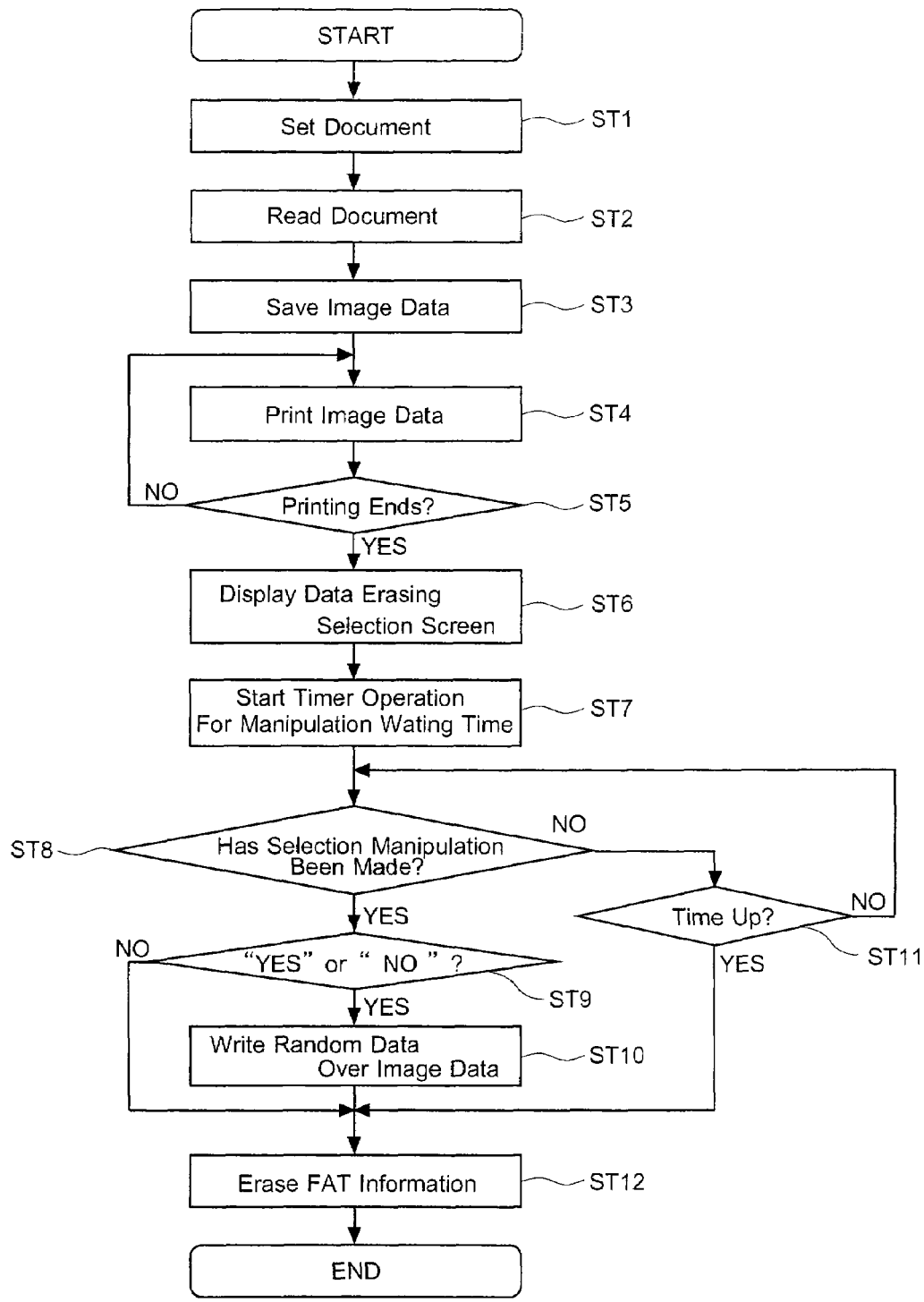
FIG. 4 is a flowchart detailing a copy job by the image forming apparatus.

The processing flow of a copy job using the image forming apparatus 100 will now be described. FIG. 4 shows the flowchart of the copy job. Initially, the document is set in the scanner unit 20 (ST1). Reading of the document is started by a manipulation on the key input unit 16 (ST2). Image data obtained in ST2 is successively compressed in an appropriate manner and saved in the image data memory unit 32 (ST3). The data saved in the image data memory unit 32 is read out sequentially and restored to data of its original size, after which the data is sent to the printing unit 22 and printed on a sheet of paper therein (ST4).

At the same time when ST4 is started, a judgment as to whether printing on a sheet of paper has ended is started (ST5). When the judgment in ST5 is "YES", the data erasing selection screen shown in FIG. 2 above is displayed at once on the liquid crystal display unit 18 (ST6). At the same time when the screen display in ST6 is performed, the timer operation for the grace time (that is, count down of the grace time) starts (ST7).

After ST7 started, whether a selection manipulation has been made on the data erasing selection screen is judged (ST8). When it is judged in ST8 that the selection manipulation has been made (in the case of 'YES'), it is further judged as to whether the selection content is the icon of "YES" or the icon of "NO" (ST9).

In a case where the judgment in ST9 is the icon of "YES", meaningless random data is written over the image data saved in the HDD 32 for the job (ST10). After the processing in ST10, the FAT information is successively erased (ST12). Processing on the image data thus ends. These ST10 and ST12 make it extremely difficult to reproduce the image data.

In a case where the judgment of ST9 is the icon of "NO", erasing processing for the FAT information (ST12) is performed without performing the data processing in ST10. Processing on the image data thus ends. In this case, a high performance can be maintained because the operation time of the HDD 32 is short and various jobs can be executed at once thereafter.

In a case where it is judged in ST8 that the selection manipulation has not been made (in the case of 'NO'), whether the grace time set for the copy job has passed (that is, whether time is up) is judged (ST11). In ST11, when the specific grace time has passed (in the case of YES), the erasing processing of the FAT information (ST12) is performed at once. Processing on the image data thus ends.

A case where the image forming apparatus 100 is used as the printer for the PC 38 will now be described briefly. A print job is executed for documents or the like created in the PC 38 by specifying the image forming apparatus 100 as the printer.

The print data generated in the PC 38 is transmitted to the image forming apparatus 100 and converted into page data therein. The page data is compressed appropriately, and is then saved in the image data memory unit 32. The page data saved in the image data memory unit 32 is read out sequentially to be restored to data of its original size, after which the data is sent to the printing unit 22 and printed on a sheet of paper therein.

When the print processing in the image forming apparatus 100 is completed, the image data erasing unit 34 causes the display of the PC terminal to display "Print out is completed. Erase Print data? "YES", "NO"" in the same manner as FIG. 2 using the two-way communications between the image forming apparatus 100 and the PC. In this instance, the same display is shown on the liquid crystal display unit 18 of the image forming apparatus 100. The user is able to erase the image data saved in the HDD 32 by manipulating the PC 38 or the liquid crystal display unit 18.

In a case where the specific grace time has passed while neither the icon of "YES" nor the icon of "NO" is selected, the erasing processing of the FAT information is performed at once, and the message that is being displayed on the PC 38 and the liquid crystal display unit 18 goes off.

The data processing method in a case where the image forming apparatus 100 is used as the transmitter of a facsimile machine is the same as the case where a copy job is executed. The data processing method in a case where the image forming apparatus 100 is used as the receiver of a facsimile machine is the same as the case where a print job is executed. In a case where the image forming apparatus 100 is used as the scanner, which is a peripheral device of the PC 38, the configuration can be the same.

While the embodiment of the present invention has been described, the invention is not limited to the embodiment above, and various modifications, alternations, and replacements can be made by those skilled in the art within the scope of the invention set forth in the appended claims. It is therefore understood that such are included in the scope of the invention.

For example, the image forming apparatus 100 described above erases data saved in the HDD 32 using the image data erasing unit 34 and the erasing timer set unit 36. The functions of these image data erasing unit 34 and the erasing timer set unit 36 are exerted by the CPU 10, the program stored in the ROM 12, the grace time stored in the RAM 14.

The security level for image data as an erasure object is not limited to two scales. It is therefore possible to configure in such a manner that the user is further able to specify the number of overwriting times of meaningless random data on the image data saved in the HDD 32. To be more concrete, in a case where the user selects the icon of "YES" when the display as shown in FIG. 2 is displayed on the liquid crystal display unit 18, plural icons representing the number of overwriting times of random data are then displayed on the liquid crystal display unit 18. The security level becomes higher as the number of overwriting times is increased. The user selects one icon among these plural icons by taking into account the degree of secrecy of the document he is handling. Erasing processing of image data that matches with the selected security level is thus performed.

The image forming apparatus 100 may be configured in such a manner that no erasing processing is applied to image data as an erasure object in a case where the user selects the icon of "NO" when the display as shown in FIG. 2 is displayed on the liquid crystal display unit 18. In this case, when a specific job is executed in the image forming apparatus 100, the CPU 10 detects an available capacity of the image data memory unit 32. When an available capacity of the image data memory unit 32 is insufficient, image data related to jobs in the past is erased appropriately. This ensures an available capacity needed to execute a new job in the image data memory unit 32.

The image forming apparatus 100 may be configured in such a manner that in a case where the user selects the erasing method of image data within the grace time set in the erasing timer set unit 36, the selected data erasing method is performed at once when this grace time has passed. When another job is being executed during this time, the priority is placed on the performance of the job and the data erasing processing comes in a pending state. The data erasing processing is performed at once after the job is completed.

The image data memory unit 32 is not limited to an HDD, and it can be other memory devices capable of reading/writing data, for example, a DVD-RAM or an MO.

What is claimed is:

1. An image forming apparatus, comprising:
    an image data input unit configured to take in image data;
    an image data memory unit configured to save image data inputted through the image data input unit;
    a data output unit configured to output the image data saved in the image data memory unit in a specific format;
    an erasing selection unit configured to request a user to make a selection as to whether or not an erasing manipulation for image data as an erasure object is to be executed after the image data is outputted by the data output unit;
    a data erasing unit configured to write random data over the image data and erase FAT information of the image data if the user selects that the erasing manipulation of the image data is to be executed, and erase the FAT information of the image data alone if the user selects that the erasing manipulation of the image data is not to be executed;
    a timer set unit configured to set a grace time during which the user is able to respond to the selection request from the erasing selection unit; and
    a controller configured to control the data erasing unit to erase the FAT information of the image data alone if the user failed to respond to a selection request from the erasing selection unit within the grace time.

2. The image forming apparatus according to claim 1, wherein the erasing selection unit requests the user to select the number of times the image data is to be overwritten with random data if the user selects that the erasing manipulation of the image data is to be executed.

3. The image forming apparatus according to claim 1, wherein the image data input unit includes:
    an optical document read unit configured to read a document as image data;
    a facsimile data reception unit configured to receive facsimile data via a telephone line; and
    a LAN control unit configured to receive print data via a LAN from a terminal linked to the LAN.

4. The image forming apparatus according to claim 3, wherein the data output unit includes:
    a print processing unit configured to print image data inputted from the image data input unit on a sheet of paper; and
    a facsimile data transmission unit configured to transmit the image data read in the optical document read unit and print data received via the LAN from the terminal to a specific facsimile receiver via the telephone line.

5. The image forming apparatus according to claim 4, wherein the grace time is set for each job executed in the image forming apparatus in the timer set unit.

6. The image forming apparatus according to claim 1, further comprising:
    a RAM (Random Access Memory) storing a relation between plural kinds of specific jobs executed in the image forming apparatus and the respective grace times having different periods,
    wherein the timer set unit is configured to set each grace time separately for each of the specific jobs.

7. The image forming apparatus according to claim 1, wherein the image data memory unit is selected from a group containing a hard disc drive, a DVD-RAM, an MO, and a second memory device operable to read/write data.

8. The image forming apparatus according to claim 1, wherein the data erasing unit is configured to erase the image data by an erasing method at a different security level according to a user selection made in response to a selection request from the erasing selection unit.

9. The image forming apparatus according to claim 8, wherein the controller controls the data erasing unit to perform a data erasing method after the grace time has expired if the user selects the data erasing method within the grace time.

10. An image forming apparatus, comprising:
    image data input means for taking in image data according to a specific job specified by a user;
    memory means for saving taken-in image data;
    data output means for outputting the image data in a specific format according to the job;
    erasing selection means for requesting the user to make a selection as to whether or not the image data is erased from the memory means after an output of the image data is completed;
    data erasing means for writing random data over the image data and erasing FAT information of the image data if the user makes the selection to erase the image data from the memory means, and for erasing the FAT information of the image data alone if the user makes the selection not to erase the image data from the memory means;
    timer set means for setting a grace time during which the user is able to respond to a selection request from the erasing selection means; and
    control means for controlling the data erasing means to erase the FAT information of the image data alone if the user failed to respond to the selection request within the grace time.

11. The image forming apparatus according to claim 10, wherein the specific job is any of a copy job, a printer job, a facsimile job, and a scanner job; and the grace time is set separately for each job in the timer set means.

12. The image forming apparatus according to claim 10, further comprising:
    a RAM (Random Access Memory) storing a relation between plural kinds of specific jobs executed in the image forming apparatus and the respective grace times having different periods,
    wherein the timer set means is configured to set each grace time separately for each of the specific jobs.

13. The image forming apparatus according to claim 10, wherein a selection from a group containing a hard disc drive, a DVD-RAM, an MO and a second memory device operable to read/write data is used for the memory means.

14. The image forming apparatus according to claim 10, wherein the data erasing means is configured to erase the image data by an erasing method at a different security level according to a user selection, if the user selection is made within the grace time.

15. A method for erasing image data for erasing image data related to a specific job from a memory device which is provided to an image forming apparatus to save image data after the job is completed, comprising:

setting a grace time during which a user is able to respond to a selection request as to whether or not the image data is erased from the memory device;

receiving an image data;

saving the image data in the memory device;

outputting the image data in a specific format;

requesting the user to make a selection as to whether or not the image data is to be erased from the memory device after outputting the image data;

judging whether the selection is made or not;

writing random data over the image data and erasing FAT information of the image data from the memory device if the user responded to the selection request within the grace time; and erasing the FAT information of the image data alone if the user failed to respond to the selection request within the grace time.

16. The image data erasing method according to claim 15, wherein the specific job is any of a copy job, a printer job, a facsimile job, and a scanner job; and the grace time is set separately for each job.

17. The method according to claim 15, wherein a RAM (Random Access Memory) storing a relation between plural kinds of specific jobs executed in the image forming apparatus and the respective grace times having different periods, the method further comprising:

setting, by a timer set unit, each grace time separately for each of the specific jobs.

18. The method according to claim 15, wherein the memory device is selected from a group containing a hard disc drive, a DVD-RAM, an MO, and a second memory device operable to read/write data.

19. The method according to claim 15, wherein the image data is erased from the memory device by an erasing method at a different security level according to a user selection if the user selection is made within the grace time.

* * * * *